(12) United States Patent  
Sato

(10) Patent No.: US 8,404,130 B2
(45) Date of Patent: Mar. 26, 2013

(54) METHOD OF MANUFACTURING A DISCRETE TRACK MEDIUM TYPE PERPENDICULAR MAGNETIC RECORDING MEDIUM

(75) Inventor: Akira Sato, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 252 days.

(21) Appl. No.: 12/854,096

(22) Filed: Aug. 10, 2010

(65) Prior Publication Data

US 2011/0048628 A1 Mar. 3, 2011

(30) Foreign Application Priority Data

Aug. 27, 2009 (JP) .................................. 2009-196957
Nov. 18, 2009 (JP) .................................. 2009-262539

(51) Int. Cl.
  *B44C 1/22* (2006.01)
(52) U.S. Cl. ................ 216/22; 216/41; 216/75; 438/738
(58) Field of Classification Search .................... 216/22, 216/26, 41, 58, 75, 76; 438/725, 736, 738, 438/742
See application file for complete search history.

(56) References Cited

U.S. PATENT DOCUMENTS

| 2002/0142192 A1 | 10/2002 | Kamata et al. | |
| 2005/0287397 A1* | 12/2005 | Soeno et al. | 428/831 |
| 2006/0021966 A1* | 2/2006 | Hattori et al. | 216/41 |
| 2006/0218773 A1* | 10/2006 | Carey et al. | 29/603.12 |
| 2007/0059562 A1* | 3/2007 | Hattori et al. | 428/836 |

FOREIGN PATENT DOCUMENTS

| JP | 56-119934 A | 9/1981 |
| JP | 04-310621 A | 11/1992 |
| JP | 2513746 B2 | 7/1996 |
| JP | 2002-288813 A | 10/2002 |
| JP | 2002-359138 A | 12/2002 |
| JP | 2003-016622 A | 1/2003 |
| JP | 2006-012285 A | 1/2006 |
| JP | 2008-065944 A | 3/2008 |
| JP | 2008-287853 A | 11/2008 |
| JP | 2009-026435 A | 2/2009 |
| JP | 2009-076146 A | 4/2009 |

(Continued)

*Primary Examiner* — Lan Vinh
(74) *Attorney, Agent, or Firm* — Rossi, Kimms & McDowell LLP

(57) ABSTRACT

A method of manufacturing a discrete track medium type perpendicular magnetic recording layer with reduced magnetic interference between tracks and enhanced magnetic recording density is disclosed in which protruding parts of a pattern of protrusions and recesses provided in a composite magnetic recording layer are formed in high quality having a similar film thickness and equivalent perpendicular magnetic recording performance to a perpendicular magnetic recording layer designed for a continuous film type medium. The method includes a first step of laminating at least a magnetic recording layer, a sacrifice layer, and a carbon protective layer on a nonmagnetic substrate in this order; a second step of selectively removing the resist film and the carbon protective layer at openings for forming recessed parts using a mask of a resist film pattern formed concentric to form protruding parts for constructing recording tracks; a third step of modifying the sacrifice layer and the magnetic recording layer exposing at the recessed parts into a nonmagnetic state; a fourth step of removing the resist film, the carbon protective layer, and the sacrifice layer at the protruding parts between the recessed parts; and a fifth step of depositing a carbon protective layer and a lubricant layer in this order on the recessed parts and the protruding parts.

16 Claims, 6 Drawing Sheets

FOREIGN PATENT DOCUMENTS

| | | |
|---|---|---|
| JP | 2009-157983 A | 7/2009 |
| WO | 2008/132880 A1 | 11/2008 |
| WO | 2008/156189 A1 | 12/2008 |
| WO | 2009/038208 A1 | 3/2009 |
| WO | 2009/081932 A1 | 7/2009 |

* cited by examiner

FIG. 1
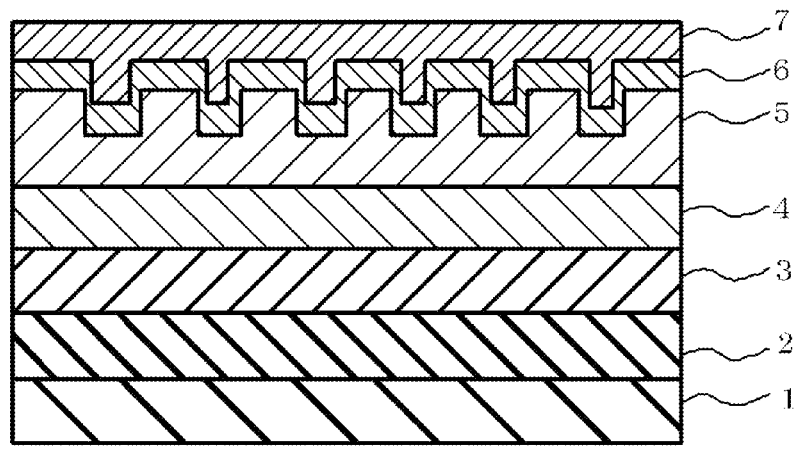
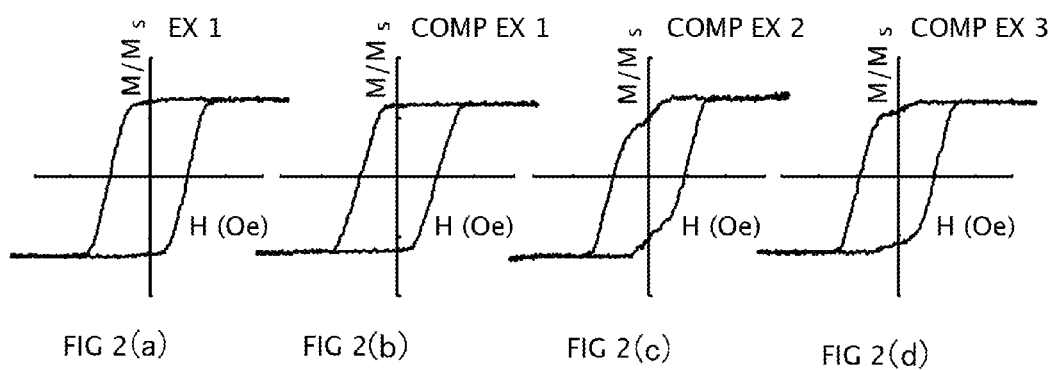
FIG 2(a)　　FIG 2(b)　　FIG 2(c)　　FIG 2(d)

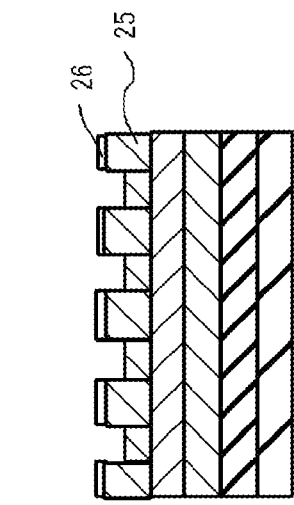
FIG. 4 (g)
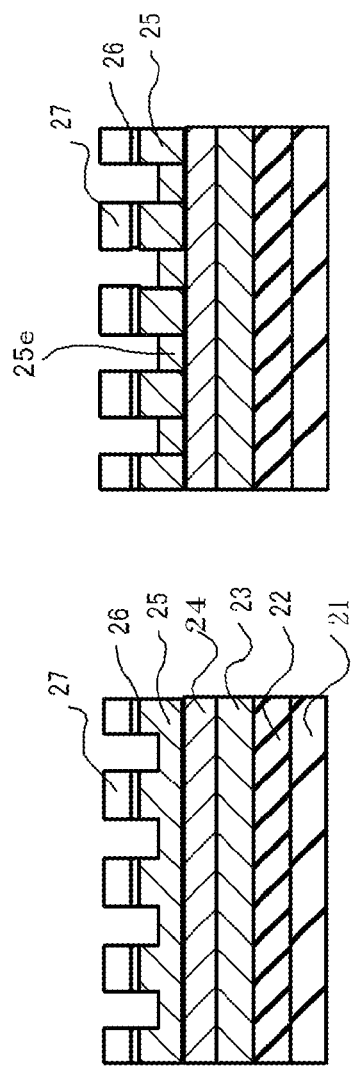
FIG. 4(h)
FIG. 4 (i)
FIG. 4 (j)
FIG. 4 (k)
FIG. 4 (l)

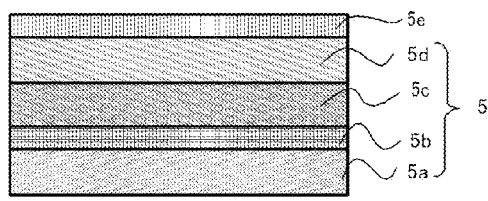
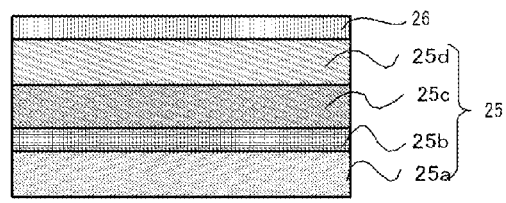
FIG. 5 (a)    FIG. 5 (b)
FIG. 6
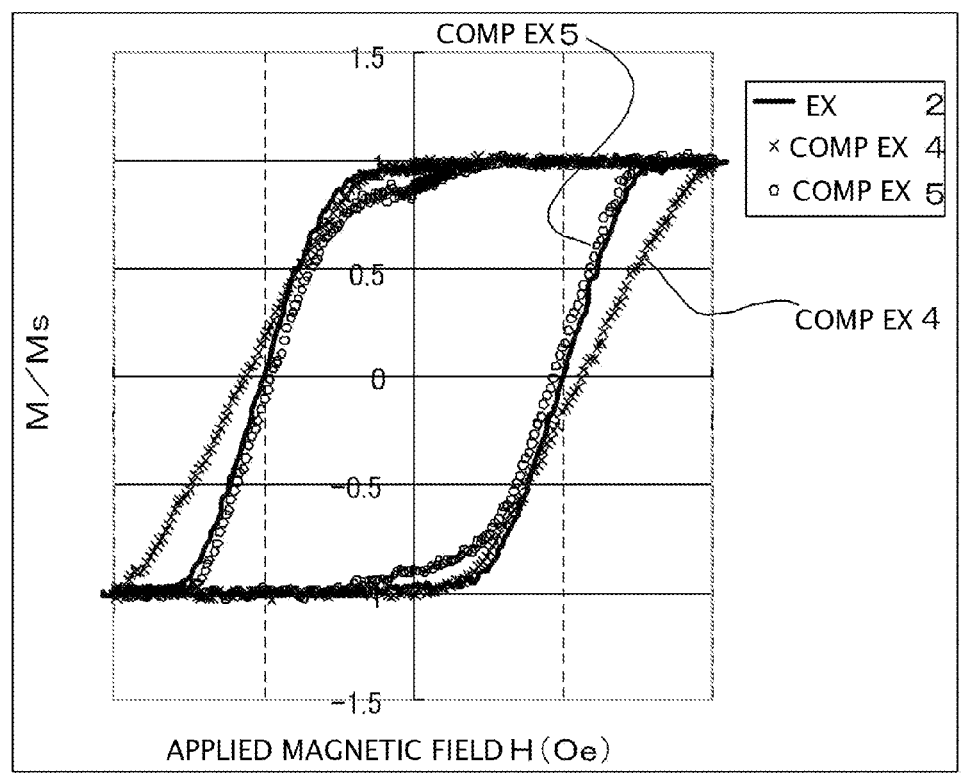

METHOD OF MANUFACTURING A DISCRETE TRACK MEDIUM TYPE PERPENDICULAR MAGNETIC RECORDING MEDIUM

BACKGROUND OF THE INVENTION

A. Field of the Invention

The present invention relates to a method of manufacturing a perpendicular magnetic recording medium mounted on magnetic recording devices (hard disk drives (HDDs) used for external memory devices for computers, AV devices and the like). In particular, the invention relates to a method of manufacturing a discrete track medium type perpendicular magnetic medium in which a concentric configuration of protrusions and recesses is formed on the surface of a magnetic recording layer of the perpendicular magnetic recording medium along the track direction, and magnetic interaction (interference) between the tracks is reduced, thereby enhancing the recording density.

B. Description of the Related Art

A recording density of hard disk drives (HDDs) is rapidly increasing recently. In order to further advance enhancement of the recording density of perpendicular magnetic recording media, it is necessary to promote magnetic separation between crystalline particles composing a magnetic recording layer and to decrease a magnetization inversion unit. It is important for this purpose to ensure physical separation of the magnetization inversion units and suppress the magnetic interaction between adjacent recording units.

In order to cope with this problem, patterned medium type magnetic recording media have been proposed including a discrete track type medium (also referred to simply as a DTM in the following description) and a bit patterned type medium (also referred to simply as a BPM). The patterned media type magnetic recording media can suppress blur to adjacent tracks in a writing process.

In a DTM type magnetic recording medium, a concentric pattern of protrusions and recesses as mentioned above is formed on a perpendicular magnetic recording layer deposited on a nonmagnetic substrate as a continuous film. In a BPM type magnetic recording medium, a desired pattern of protrusions is formed to provide an uneven structure. Recording tracks formed in the protruding parts in both types of patterned medium type magnetic recording media are separated physically and magnetically with adjacent recessed parts and are independent of one another, to clearly isolate the magnetization inversion units.

The pattern of protrusions and recesses is formed using a carbon film or the like for a mask material on the surface of a magnetic recording medium by removing the unmasked parts by a dry etching method such as an ion beam etching with inert gas or reactive ion etching to create recessed parts.

Of the patterned media type magnetic recording media, the DTM type magnetic recording medium is effectively manufactured by providing on a perpendicular magnetic recording layer a concentric pattern of protrusions and recesses along a track direction. Various related prior technologies have already been proposed.

The technology disclosed in Japanese Unexamined Patent Application Publication No. H04-310621 and S56-119934, provides void regions in the recording magnetic layer between tracks. These documents also disclose a magnetic recording layer formed in a spiral shape to reduce side crosstalk on reproduction and enhance track density.

Japanese Patent No. 2513746 discloses a perpendicular magnetic recording medium in which nonmagnetic guard bands for isolation between recording tracks formed in the perpendicular magnetic recording layer are formed on the soft magnetic backing layer.

Japanese Unexamined Patent Application Publication No. 2003-016622 and 2006-012285 disclose a magnetic recording medium having a recording layer separated into a multiple of recording elements in a prescribed pattern of protrusions and recesses to surely hinder erroneous writing on adjacent tracks.

Japanese Unexamined Patent Application Publication No. 2002-288813 discloses a magnetic recording medium with a smooth surface comprising a plurality of magnetic sections and separation sections that surround the magnetic sections and have a magnetic property modified by ion implantation.

Japanese Unexamined Patent Application Publication No. 2002-359138 discloses a method in which a ferromagnetic layer is selectively masked with a resist and selectively modified to create nonmagnetic parts by exposing to active reactive plasma ions containing halogen to separate the ferromagnetic parts. Similar description is made in Japanese Unexamined Patent Application Publication No. 2008-065944.

The etching process is favorably executed in process conditions that completely separate the magnetic recording layer and with a minimum etching amount to preserve head flying performance and environment resistance. More specifically, a process for magnetic separation between tracks has been proposed in which the top surface layer of a magnetic recording layer is removed and the resulted recessed parts are exposed to reactive ion plasma containing halogen such as fluorine in order to obtain nonmagnetic parts by modifying the magnetic properties through chemical reaction.

The proposal, although it does not mention a specific mechanism, utilizes the fact that a magnetic recording layer with a granular structure employed in an ordinary perpendicular magnetic recording medium with $SiO_2$ filled between magnetic particles can be readily modified to become a nonmagnetic layer by modifying magnetic properties thereof with reactive ion plasma containing halogen. Since the technology actively utilizes the reactive ion plasma containing halogen gas, the magnetic recording layer suffers from development of corrosion in some extent.

Japanese Unexamined Patent Application Publication No. 2009-076146 discloses a method for avoiding deterioration of long term stability of recording data due to corrosion by eliminating, through irradiation of inert gas ions, the surface layer of the magnetic recording layer corroded in the process using the etching gas containing halogen.

Japanese Unexamined Patent Application Publication No. 2009-026435 discloses formation of a magnetic recording pattern with a magnetically separated magnetic layer by exposing parts of the magnetic layer surface to reactive plasma of oxygen or halogen to selectively transform the magnetic layer to amorphous or nonmagnetic state.

Japanese Unexamined Patent Application Publication No. 2008-287853 discloses a magnetic recording medium having a composite magnetic recording layer including a first magnetic recording layer, a second magnetic layer, and a third magnetic recording layer. The first and second magnetic recording layers have a granular structure interposing a coupling layer in between. The third magnetic recording layer has an axis of easy magnetization in the direction perpendicular to the surface of the nonmagnetic substrate.

Japanese Unexamined Patent Application Publication No. 2009-157983 discloses a method of manufacturing a magnetic recording medium having a magnetic layer with a granular structure and a magnetic layer with a nongranular structure provided on the granular magnetic layer, the method forming a magnetic recording layer pattern with a magnetic separation structure, wherein the magnetic recording layer surface is slightly eliminated after removing a resist and a carbon mask layer.

Most of the magnetic recording layers used in perpendicular magnetic recording media employ a granular structure, in which magnetic particles are surrounded by oxides separating and isolating the magnetic particles. A magnetic recording layer entirely composed of the granular structure material, however, exhibits a large magnitude of a uniaxial magnetic anisotropy constant Ku and simultaneously a large value of magnetic inversion field, the latter being in proportion to the Ku value, resulting in rather degraded ease of recording.

Consequently, in order to improve performance of a magnetic recording medium as a whole, perpendicular magnetic recording media have nowadays become common in which the top layer of the magnetic recording layer does not have a granular structure and have a structure provided with a metal layer of an appropriate thickness, the metal layer consisting of a nongranular structure and being composed of continuous magnetic particles (metallic magnetic particles). Such a structure can achieve a good S/N ratio and an overwrite characteristic.

Most of the DTMs known in the art employ a procedure in which a machining step for creating protrusions and recesses is conducted after depositing a continuous film of a perpendicular magnetic recording layer. In the method, however, the protruding parts of the top layer of the magnetic recording layer (the metal layer) are exposed to various etching gases in the machining step for forming protrusions and recesses, resulting in damages of oxidation and corrosion beginning at the edge of the protruding parts.

As a consequence, the metal layer formed with an appropriate thickness cannot exhibit an expected performance, and the protruding parts of the magnetic recording layer greatly degrade in their performance of a magnetic recording medium. When the magnetic recording layer is covered with a carbon protective layer in a damaged state remaining corroded parts under the carbon protective layer and fabricated into a product of DTM, the product may be adversely affected in long term reliability due to elemental elution (or corrosion) in the future.

Japanese Unexamined Patent Application Publication No. 2009-076146 discloses a method of manufacturing a magnetic recording medium in which the corroded parts are eliminated by irradiating the whole surface of the magnetic recording layer with inert gas to stabilize the magnetic recording layer and suppressing migration of magnetic alloy even under a high temperature and high humidity environment.

This method, however, has a problem that an etching effect of the inert gas decreases a volume fraction occupied by the top magnetic layer resulting in a large magnitude of a coercivity Hc of the magnetic recording layer as a whole and a large value of an inversion magnetic field, which deteriorates ease of recording.

The inventor of the present invention has made extensive experimental studies and found that, in a magnetic recording medium having a continuous film to fabricate a DTM, a perpendicular magnetic recording medium with a high density three layer structure is rather possible to hold high density recording performance and suited to a DTM.

The inventor of the present invention has further found that a magnetic recording layer having a granular structure containing $SiO_2$ filled between magnetic particles employed in ordinary perpendicular magnetic recording medium significantly exhibits a modification effect on magnetic properties by exposing it to reactive gas of halogen containing mainly fluorine and a magnetic separation effect in a DTM pattern.

The present invention is directed to overcoming or at least reducing the effects of one or more of the problems set forth above.

SUMMARY OF THE INVENTION

The present invention provides a method of manufacturing a discrete track medium type perpendicular magnetic recording medium with reduced magnetic interference between tracks and enhanced magnetic recording density in which protruding parts of a pattern of protrusions and recesses provided in a composite magnetic recording layer are formed in high quality having a similar film thickness and equivalent perpendicular magnetic recording performance, to a perpendicular magnetic recording layer designed for a continuous film.

A method of manufacturing a discrete track medium type perpendicular magnetic recording medium comprises: a first step of laminating at least a magnetic recording layer, a sacrifice layer, and a carbon protective layer on a nonmagnetic substrate in this order; a second step of selectively removing the carbon protective layer and upper layers at openings for forming recessed parts, using a mask of a resist film pattern formed concentric to form protruding parts for constructing recording tracks; a third step of modifying the sacrifice layer and the magnetic recording layer exposing at the recessed parts into a nonmagnetic state; a fourth step of removing the resist film, the carbon protective layer, and the sacrifice layer at the protruding parts between the recessed parts; and a fifth step of depositing a carbon protective layer and a lubricant layer in this order on the recessed parts and the protruding parts.

Preferably, a soft magnetic backing layer and a nonmagnetic underlayer are further provided in this order between the nonmagnetic substrate and the magnetic recording layer. Also, preferably, the magnetic recording layer contains at least a ferromagnetic material having an axis of easy magnetization orienting in the direction perpendicular to a film surface of the magnetic recording layer.

Preferably, the magnetic recording layer is a composite magnetic recording layer including an upper magnetic recording layer, a coupling layer, and a lower magnetic recording layer, and preferably further includes a middle magnetic recording layer between the upper magnetic recording layer and the coupling layer, the lower magnetic recording layer and the middle magnetic recording layer contain a ferromagnetic material having a granular structure.

Preferably, the sacrifice layer has the same composition as a composition of a surface layer of the magnetic recording layer, and a thickness in a range of 0.5 to 5.0 µm.

Preferably, removal of the carbon protective layer in the second step is carried out by a reactive ion etching process using oxygen gas.

Preferably, a process of modifying the sacrifice layer and the magnetic recording layer exposing at the recessed parts into a nonmagnetic state of the third step is carried out by exposing to reactive ion plasma containing a halogen-containing gas, reactive etching using oxygen gas, and irradiation of inert gas ions. Preferably, the halogen-containing gas contains fluorine ions. Still more preferably, the magnetic recording layer contains a substance(s) that vaporize and disappear by chemical reaction with the reactive ion plasma containing the fluorine ions.

Preferably, in the fourth step, a process of removing the resist film and the carbon protective layer is carried out by a reactive ion etching process, and a process of removing the sacrifice layer is carried out by a process of irradiation of inert gas ions. Preferably, the substance that vaporizes and disappears is $SiO_2$.

Preferably, the lower magnetic recording layer and the middle magnetic recording layer, both having the granular structure, contain a nonmagnetic oxide(s) at least one of which is $SiO_2$, and preferably the $SiO_2$ of the nonmagnetic oxide(s) is contained in an amount at least two times an amount of the nonmagnetic oxides other than the $SiO_2$.

Preferably, a uniaxial magnetic anisotropy constant Ku1 of the lower magnetic recording layer, a uniaxial magnetic anisotropy constant Ku2 of the middle magnetic recording layer, and a uniaxial magnetic anisotropy constant Ku3 of the upper magnetic recording layer are different from each other and satisfies a relation between their magnitudes Ku1>Ku2>Ku3.

Preferably, the coupling layer is composed of an element selected from the group consisting of V, Cr, Fe, Co, Ni, Cu, Nb, Mo, Ru, Rh, Ta, W, Re, and Ir, and alloys mainly composed of at least one of these elements, and has a thickness at most 0.3 nm.

The present invention provides a method of manufacturing a discrete track medium type perpendicular magnetic recording medium with reduced magnetic interference between tracks and enhanced magnetic recording density in which protruding parts of a pattern of protrusions and recesses provided in a composite magnetic recording layer are formed in high quality having a similar film thickness and equivalent perpendicular magnetic recording performance, to a perpendicular magnetic recording layer designed for a continuous film.

BRIEF DESCRIPTION OF THE DRAWINGS

The foregoing advantages and features of the invention will become apparent upon reference to the following detailed description and the accompanying drawings, of which:

FIG. 1 is a schematic sectional view of an essential part of a DTM type perpendicular magnetic recording medium according to the present invention;

FIGS. 2(a) through 2(d) show characteristics of a DTM type perpendicular magnetic recording medium in comparison between Example 1, and Comparative Example 1, Comparative Example 2, and Comparative Example 3;

FIGS. 4(g) through 4(l) are schematic sectional views showing main processes in manufacturing a DTM type perpendicular magnetic recording medium according to the present invention continued from FIG. 3(f);

FIGS. 5(a) and 5(b) are schematic sectional views showing a construction in a process of forming a composite magnetic recording layer in a DTM type perpendicular magnetic recording medium according to the present invention;

FIG. 6 shows characteristics of a DTM type perpendicular magnetic recording medium in comparison between Example 2, and Comparative Example 4 and Comparative Example 5;

DETAILED DESCRIPTION OF SPECIFIC EMBODIMENTS

Figure 3:
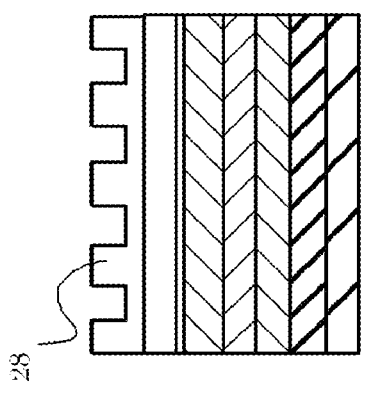
FIGS. 3(a) through 3(f) are schematic sectional views showing main processes in manufacturing a DTM type perpendicular magnetic recording medium according to the present invention continuing to FIG. 4(g)
Figure 3:
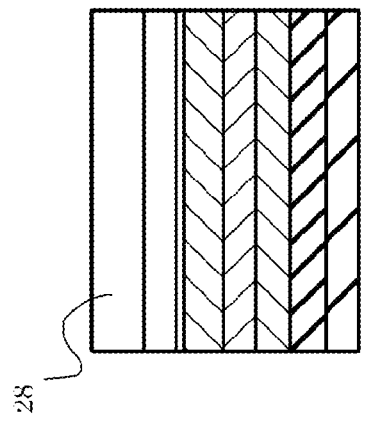
Figure 3:
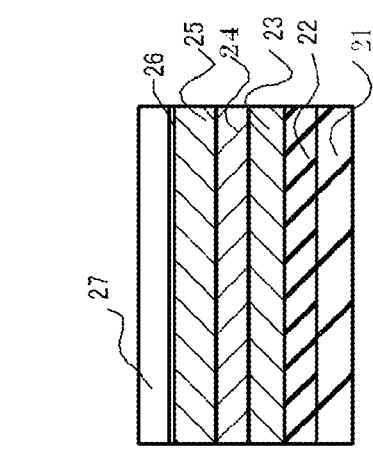
Figure 3:
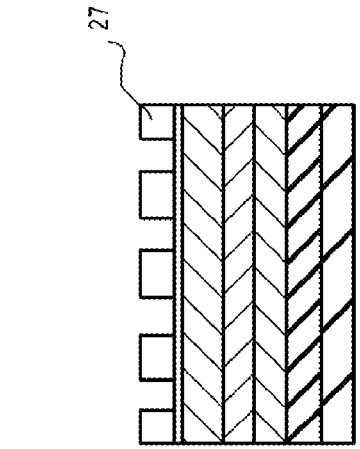
Figure 3:
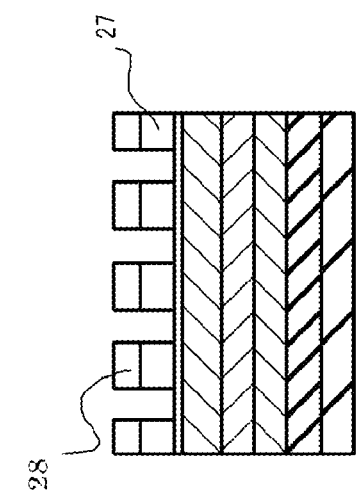
Figure 3:
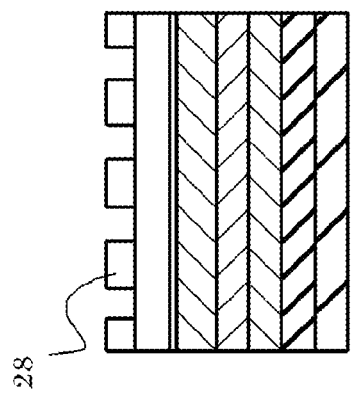

Now, some preferred embodiments according to the present invention will be described in detail with reference to accompanying drawings. FIG. 1 is a schematic sectional view of an essential part of a DTM type perpendicular magnetic recording medium manufactured by a method of manufacturing a DTM type perpendicular magnetic recording medium according to the present invention. The DTM type perpendicular magnetic recording medium comprises soft magnetic backing layer 2, underlayer 3, nonmagnetic intermediate layer 4, composite magnetic recording layer 5 with a surface configuration of protrusions and recesses composed of three layers, carbon protective layer 6, and liquid lubricant layer 7, all sequentially formed on nonmagnetic substrate 1.

Nonmagnetic substrate 1 can be a substrate commonly used in magnetic recording media, for example, the one composed of a NiP-plated aluminum alloy, reinforced glass, or crystallized glass. When a substrate heating temperature is within 100° C., a plastic substrate composed of a resin such as polycarbonate, polyolefin and the like can be used as well.

Soft magnetic backing layer 2 is preferably provided for controlling a magnetic flux from a magnetic head used for magnetic recording, to improve recording and reproducing performances, although it can be omitted. Soft magnetic backing layer 2 can be composed of a crystalline alloy of FeTaC, Sendust (an FeSiAl alloy) or the like, or an amorphous cobalt alloy of CoZrNb, CoTaZr or the like.

A thickness of soft magnetic backing layer 2, in a case of successive deposition with other layers, is preferably in the range of 10 nm to 500 nm in consideration of balance with productivity, although the optimum value varies depending on a structure and a characteristic of a magnetic head used in recording. When soft magnetic backing layer 2 is preliminarily formed on the nonmagnetic substrate by a plating method for example, before depositing other layers, the thickness can be made to be a larger value of several μm.

Underlayer 3 is preferably provided for controlling crystal orientation and grain size of nonmagnetic intermediate layer 4 or composite magnetic recording layer 5 with a surface configuration of protrusions and recesses, intermediate layer 4 and the composite magnetic recording layer being formed on underlayer 3. Underlayer 3 can be composed of a nonmagnetic material or a soft magnetic material. Underlayer 3 can be omitted.

An underlayer composed of a soft magnetic material is preferably employed since the underlayer partly carries the function of the soft magnetic backing layer. The soft magnetic material can be selected from permalloy materials including NiFeAl, NiFeSi, NiFeNb, NiFeB, NiFeNbB, NiFeMo, and NiFeCr. A thickness of a permalloy underlayer is adjusted to attain optimum magnetic characteristics and electromagnetic conversion characteristics of the magnetic recording layer, and preferably in the range of 3 nm to 50 nm in consideration of balance between magnetic recording medium performance and productivity.

An underlayer composed of a nonmagnetic material can be formed of Ta, Zr, $Ni_3Al$ or the like. A thickness of an underlayer composed of a nonmagnetic material is preferably as thin as possible in view of efficiently concentrating a magnetic field generated by a magnetic head in the soft magnetic backing layer, and favorably in the range from 0.2 to 10 nm.

A nonmagnetic intermediate layer 4 is provided for favorably controlling crystal orientation, grain size, and grain boundary segregation of composite magnetic recording layer 5 with a surface configuration of protrusions and recesses, although nonmagnetic intermediate layer 4 can be omitted. A material for nonmagnetic intermediate layer 4 can be selected from ruthenium; ruthenium-based alloys containing one or more additive elements selected from the group consisting of C, Cu, W, Mo, Cr, Ir, Pt, Re, Rh, Ta, and V; and metallic elements of Pt, Ir, Re, and Rh.

A thickness of nonmagnetic intermediate layer 4 is necessarily as thin as possible for achieving high density recording as long as it does not degrade magnetic characteristics and electromagnetic conversion characteristics of the magnetic recording layer, and specifically in the range of 1 nm to 20 nm.

The first magnetic recording layer, which is a lower magnetic recording layer disposed at the bottom of composite magnetic recording layer 5, is composed using a ferromagnetic material of an alloy containing at least cobalt and platinum. The first magnetic recording layer necessarily has an axis of easy magnetization (for example, c-axis in a hexagonal closest packed structure) that is oriented in a direction perpendicular to the film surface in order to be used in a perpendicular magnetic recording medium.

Such a material for forming the magnetic recording layer can be appropriately selected from materials for forming a granular structure including $CoPt$—$SiO_2$, $CoCrPt$—$SiO_2$, $CoPt$—$SiO_2$—$TiO_2$, $CoCrPt$—$SiO_2$—$TiO_2$, $CoCrPt$—$SiO_2$—$Al_2O_3$, $CoPt$—$SiO_2$—$AlN$, and $CoCrPt$—$SiO_2$—$Si_3N_4$. These materials contain an alloy material such as CoPt, CoCrPt, CoCrPtB, CoCrPtTa and grain boundary materials of $SiO_2$ and the like.

The granular structure is composed of matrix of nonmagnetic oxide or nonmagnetic nitride and magnetic crystalline particles dispersed in the matrix, and it suppresses interaction between adjacent magnetic crystalline particles in a magnetic recording layer.

In a structure provided with a coupling layer between the first magnetic layer and a second magnetic layer (a middle magnetic recording layer) on the first magnetic recording layer, interaction between magnetic crystalline particles is suppressed in the magnetic recording layer while holding the coupling between the first and second magnetic layers.

Since this structure improves characteristics of noises and S/N ratio, the granular structure is preferably used at least in a part of the composite magnetic recording layer, in particular in the lower magnetic recording layer.

In the magnetic recording layer of a composite magnetic recording layer with a multiple layer structure, a coupling layer inserted right on the first magnetic recording layer (a lower magnetic recording layer) at the bottom and just beneath the second magnetic recording layer (a middle magnetic recording layer), i.e., between the first and second recording layers, is necessary to appropriately generate ferromagnetic coupling between the first magnetic recording layer and the second magnetic recording layer and reduce a coercivity Hc averaged over the entire composite magnetic recording layer.

In a magnetization inversion mechanism of a magnetic recording layer in the case of two layers of the first and second magnetic recording layers laminated without a coupling layer, the ferromagnetic coupling energy of these layers is so large that the two layers accomplish magnetization inversion simultaneously responding to externally applied magnetic field hindering effective reduction of coercivity Hc of the whole magnetic recording layer. This case inhibits the mechanism that reduces an inversion magnetic field while improving long term stability of recorded data by individual magnetization inversion in the magnetic recording layer.

In the case a coupling layer is provided, in contrast, on application of an external magnetic field, magnetization inversion first occurs in the upper or lower magnetic recording layer that has a smaller uniaxial magnetic anisotropy constant Ku and a lower coercivity Hc. This initial magnetization inversion induces magnetization inversion of the other magnetic recording layer that has a larger uniaxial magnetic anisotropy constant Ku and a higher coercivity Hc, reducing a coercivity Hc of the magnetic recording layer as a whole. A two step magnetization, in which different magnetization inversion processes occur in the upper and lower magnetic recording layers, contributes to an effective function that the inversion magnetic field is reduced while maintaining long term stability of data thereby improving ease of recording.

If a thickness of the coupling layer is so large that exchange coupling between the laminated magnetic layers completely vanishes, an energy barrier lowers, hindering secure long term stability. Therefore, the coupling layer needs to bring about an appropriate coupling energy between the magnetic recording layers while maintaining the ferromagnetic coupling. The ferromagnetic coupling between magnetic recording layers must exist at room temperature at which a perpendicular magnetic recording medium is used.

A material for use in the coupling layer can be selected from the group consisting of V, Cr, Fe, Co, Ni, Cu, Nb, Mo, Ru, Rh, Ta, W, Re, Ir, and alloys mainly composed of these elements. A nonmagnetic material such as V, Cr, or Cu used in the coupling layer can provide ferromagnetic coupling between magnetic recording layers and an appropriate coupling energy by adjusting a thickness of the coupling layer.

A ferromagnetic material such as Fe, Co, or Ni used in the coupling layer can provide appropriate coupling energy by alloying with a nonmagnetic material and adjustment of deposition conditions and an atmosphere in the deposition process. A thickness of the coupling layer is preferably at most 0.3 nm.

The reason for the thickness range is that a thickness not larger than 0.3 nm of the coupling layer materials except for Fe, Co, and Ni can control the coupling energy in a wide range and hold magnetic isolation between crystal particles composing the magnetic recording layer thereby reducing noises.

In the case of Fe, Co and Ni, a thickness not larger than 0.3 nm can control an adverse effect of magnetic properties of Fe, Co, and Ni down to a negligible extent.

A thickness of the coupling layer larger than 0.3 nm is improper because the ferromagnetic coupling between the first magnetic recording layer and the second magnetic recording layer vanishes and the magnetization inversion responding to magnetic field application becomes a two step process (a spin flop phenomenon), causing inhibition of data recording and blurred write.

A second magnetic recording layer can be composed of the same material and structure as the first recording layer. When ferromagnetic coupling through a coupling layer is provided, a granular structure is preferably employed for the second magnetic recording layer as well as the first magnetic recording layer because the interaction between magnetic crystalline particles in the magnetic recording layer can be suppressed while maintaining coupling between the magnetic recording layers.

By increasing a proportion occupied by the granular structure in a composite magnetic recording layer, a magnetization inversion unit is minimized, thereby enhancing recording density.

Here, the first magnetic recording layer and the second magnetic recording layer are designed by selecting appropriate thicknesses and materials to satisfy the following relationship:

$$Ku1\ T1 > Ku2\ T2$$

where Ku1 and T1 are a uniaxial magnetic anisotropy constant and a thickness respectively of the first magnetic recording layer, and Ku2 and T2 are a uniaxial magnetic anisotropy constant and a thickness respectively of the second magnetic recording layer.

The reason for this design is that the magnetization inversion occurs in the second magnetic recording layer earlier than in the first magnetic recording layer. This sequence effectively reduces the inversion magnetic field while maintaining long term stability of data.

A third magnetic recording layer, which is the uppermost layer, can be composed using the same material and structure as the first magnetic recording layer and the second magnetic recording layer.

The first magnetic recording layer, the second magnetic recording layer, and the third magnetic recording layer are designed to satisfy the following relationship. The third magnetic recording layer, the uppermost layer, is designed with respect to the first magnetic recording layer to satisfy a relation $Ku1\ T1 > Ku3\ T3$ by appropriately selecting thicknesses and materials of the first and third magnetic recording layers, wherein Ku3 and T3 are a uniaxial magnetic anisotropy constant and a thickness, respectively, of the third magnetic recording layer. The reason for this setting is the same as the one described above for the relation between the first and second magnetic recording layers.

As for the relationship with respect to the second magnetic recording layer, Ku3 is not equal to Ku2 and preferably is smaller than Ku2. In addition, relations $Ku1 \geq 10\ Ku2$ and $Ku1 \geq 10\ Ku3$ are more preferable to ensure long term stability of data.

It is known in the art that a platinum content in the magnetic recording layer is preferably decreased in order to reduce media noise and enhance S/N ratio. However, the decrease in platinum content deteriorates long term stability of data. In conventional magnetic recording layers, a platinum content is set at a magnitude higher than 10 at % in order to ensure long term stability of data.

In contrast, since a composite magnetic recording layer capable of controlling the coupling energy according to the invention maintains satisfactory long tern stability, the platinum content can be reduced. Specifically, the platinum content can be reduced in the third magnetic recording layer, which has the lowest uniaxial magnetic anisotropy constant Ku and begins magnetization inversion first. The third magnetic recording layer can be composed of a material that does not contain platinum at all. Even in a platinum containing case, the content can be reduced to an amount less than 10 at %. Therefore, media noise is reduced, improving S/N ratio, and the inversion magnetic field is effectively reduced, as is clarified in this specification.

As for a composition of a magnetic recording medium as mentioned above, the third magnetic recording layer having the lowest uniaxial anisotropy constant Ku preferably contains at least cobalt and chrome, and platinum is at most 10 at %, if present. It is more preferable that the third magnetic recording layer further contains at least one element selected from the group consisting of Ta, B, Nb, N, and Cu. This composition further promotes reduction of media noise and effectively reduces an inversion magnetic field of a magnetic recording layer.

Now description is made of the second magnetic recording layer and the third magnetic recording layer. The third layer is, as described previously, a layer of low uniaxial magnetic anisotropy constant. The reason for providing a coupling layer between the first and second magnetic recording layers is to reduce a coercivity Hc using the coupling layer and to hinder decrease in an effective uniaxial magnetic anisotropy constant Ku, thereby avoiding degradation in long term stability of data. No coupling layer is provided between the second and third magnetic recording layers.

This construction is used in order to reduce effective uniaxial magnetic anisotropy constants Ku of the second magnetic recording layer and the third magnetic recording layer, decrease an inversion magnetic field, and improve ease of recording. The third magnetic recording layer, which couples to the second magnetic recording layer, but not through a coupling layer, and which has the smallest uniaxial magnetic anisotropy constant Ku, more effectively reduces the coercivity Hc utilizing the small uniaxial magnetic anisotropy constant Ku. A magnetization inversion initiating magnetic field Hn is ensured even when a proportion of a layer with a low uniaxial magnetic anisotropy constant Ku in the entire magnetic recording layer for achieving ease of recording by means of controlling exchange coupling between magnetic particles by adjusting a platinum content or adding an element such as Ta, B, Nb, N, or Cu. These means promote reduction of media noise, and simultaneously perform high recording density, ease of recording, and further, long term stability of data.

More preferably, a sacrifice layer is deposited on the third magnetic recording layer, which is the uppermost layer of the magnetic recording layer, as an extension of the third magnetic recording layer. The sacrifice layer is deposited using the same material as the third magnetic recording layer that is the top layer of the magnetic layer, providing a simple manufacturing method at a low cost.

A thickness of the sacrifice layer is preferably designed in the range of 0.5 to 5.0 nm. The reason for this range is because the sacrifice layer is preliminarily provided to remove damage produced during the following steps, which damage reaches about 3 nm from the outermost surface. In addition, favorable flatness of a magnetic recording layer surface is obtained by fabricating the sacrifice layer with a thickness in the above-mentioned range. A thickness less than 0.5 nm is inadequate because a damaged part is not completely removed. A thickness set at a magnitude larger than 5 nm impairs the flatness of the magnetic recording layer surface and is also improper, although the damaged layer can be completely removed. The sacrifice layer is removed before a step of forming a protective layer conducted afterwards, and is thus absent when a DTM type perpendicular magnetic recording medium is completed.

Protective layer 6 deposited on the sacrifice layer is preferably composed of a thin film of mainly carbon. Other various materials commonly used for a protective layer in magnetic recording media can be used as well. Liquid lubricant layer 7 applied on protective layer 6 can be composed of a perfluoropolyether lubricant, for example. Other various materials commonly used for a liquid lubricant layer in magnetic recording media can be used as well.

Soft magnetic backing layer 2, underlayer 3, and nonmagnetic intermediate layer 4 laminated on nonmagnetic substrate 1 can be formed by means of various deposition techniques that are used in the technical field of magnetic recording media and well known in the art. For example, the layers except for liquid lubricant layer 7 can be formed by means of a DC magnetron sputtering method, RF magnetron sputtering method, or a vacuum evaporation method. For forming the liquid lubricant layer, a dip coating method or a spin coating method can be employed.

Example 1

The following describes in detail an embodiment according to a method of manufacturing a discrete track media type perpendicular magnetic recording medium according to the present invention, with reference to FIG. 1, FIGS. 2(a) through 2(d), and FIG. 5(a). The present invention is, however, not limited to the described specific aspects, but can be modified within the spirit and scope of the invention by a person skilled in the art.

For nonmagnetic substrate 1 as illustrated in FIG. 1, a NiP-plated aluminum alloy with a smooth surface is used. After cleaning, the substrate is introduced into a sputtering apparatus and amorphous soft magnetic backing layer 2 of CoZrNb having a thickness of 40 nm is deposited using a target of Co—Zr—Nb.

Then, underlayer 3 of NiFeSi 10 nm thick is deposited using a target of a permalloy of Ni—Fe—Si. Subsequently, nonmagnetic intermediate layer 4 of ruthenium 10 nm thick is deposited using a ruthenium target.

Subsequently, as shown in FIG. 5(a), first magnetic recording layer 5a (a lower magnetic recording layer) of CoCrPt—$SiO_2$ having a granular structure with a thickness in the range of 4 to 8 nm is deposited at the bottom of composite magnetic recording layer 5 using a target of 93(Co-8Cr-20Pt)-7$SiO_2$.

Then, ruthenium coupling layer 5b is deposited in a thickness of 0.2 nm using a ruthenium target. Subsequently, second magnetic recording layer 5c (a middle magnetic recording layer) of CoCrPt—$SiO_2$ having a granular structure is deposited with a thickness of 4.0 nm using a target of 93(Co-15Cr-10Pt)-7$SiO_2$.

Subsequently, a metal layer of a magnetic recording layer of CoCrPtB is deposited with a thickness of 8.0 nm using a target of 96(Co-15Cr-10Pt)-4B. Of the thickness of 8.0 nm of the magnetic recording layer, 6.0 nm is a design value of a thickness of third magnetic recording layer 5d (an upper magnetic recording layer), and the remaining 2.0 nm corresponds to a thickness of sacrifice layer 5e that is to be removed as a damaged layer in a post step.

Thus, composite magnetic recording layer 5 is composed of a bottom layer of first magnetic recording layer 5a, coupling layer 5b, a middle layer of second magnetic recording layer 5c, and a top layer of third magnetic recording layer 5d.

Finally, protective layer 6 of carbon (including crystalline carbon having a diamond structure) is deposited with a thickness of 14 nm using a carbon target, and taken out of the vacuum device.

The layers of composite magnetic recording layer 5 are formed by means of an RF sputtering method.

Other layers are formed by means of a DC magnetron sputtering method. In this state having sacrifice layer 5e, the top layer of the third magnetic recording layer (the metal layer) has a large volume, and a process of magnetization inversion is divided within the composite magnetic recording layer. The characteristic as a magnetic recording medium is poor and not suited to a perpendicular magnetic recording medium. Removal of the sacrifice layer will be described afterwards.

Then, a resist is applied on carbon protective layer 6 by a spin coating method. The resist is pressed by a stamper having a transfer pattern to form a pattern of protrusions and recesses in the imprinting method. Useful resist materials include thermoplastic resins such as poly (methylmethacrylate) (PMMA) and thermosetting resins such as epoxy for a thermal nano-imprinting process; and UV hardening resins such as UV hardening acrylic resin for a UV nano-imprinting process.

Then utilizing the step configuration formed in the resist pattern of protrusions and recesses, separation of the surface layer of composite magnetic recording layer 5 is carried out by a dry etching method to form protrusions and recesses. Specifically, thinner parts of the resist are removed by a reactive ion etching (RIE) method using a reactive gas of halogen, and the parts of carbon protective layer 6 exposed after removal of the resist are removed by a reactive ion etching (RIE) method using oxygen gas.

Further, argon ions are irradiated in the conditions of an acceleration voltage of from 200 V to 700 V and an ion beam current of 200 mA to remove sacrifice layer 5e under carbon protective layer 6. As a result, the parts of the magnetic recording layer at the recessed parts of the outermost surface are exposed.

The protruding parts, on the other hand, are in the state leaving the sacrifice layer, the carbon protective layer, and the thicker parts of the resist on the magnetic recording layer. Subsequently in this condition, the magnetic layers at the recessed parts are transformed to a nonmagnetic layer by exposing to reactive ion plasma containing a halogen reactive gas of $CF_4$ gas.

In order to enhance etching machining capability in the vertical direction in particular during this process, a bias voltage in the range of 20 to 100 V is applied vertically onto the whole film surface. This means promotes the reaction between the fluorine ions in the $CF_4$ gas and silicon in magnetic recording layer 5 to vaporize the substances, facilitating desorption from magnetic recording layer 5. Moreover, chemical reaction with magnetic particles is also facilitated, promoting transformation of the recessed parts to a nonmagnetic state.

Thus, composite magnetic recording layer 5 with a surface configuration of protrusions and recesses is made to have the recessed parts modified to a nonmagnetic state. After that, the thick resist and underlying carbon protective layer 6 remaining on the protruding parts are removed by reactive ion plasma using $CF_4$ gas and oxygen gas.

Then, a physical etching is conducted using argon gas in the conditions of an acceleration voltage of from 200 to 700 V and an ion beam current of 200 mA. This process removes sacrifice layer 5e to an extent of 2 nm thick, the surface region of the edge and the side wall of the protruding parts in particular, of third magnetic recording layer 5d composed of the CoCrPtB metal including portions corroded by the reactive ion plasma containing the $CF_4$ gas. In place of the argon gas described above, an inert gas other than argon, for example, He, Kr, or Xe can also be used for removing sacrifice layer 5e.

After removing sacrifice layer 5e, a carbon protective layer is again deposited uniformly on the surface with protrusions and recesses by the same method as the previous deposition step. Then, liquid lubricant layer 7 of perfluoropolyether 2 nm thick is applied by a dip coating method. Thus, a DTM type perpendicular magnetic recording medium is obtained.

Comparative Example 1

In the manufacturing method described in Example 1, the top magnetic recording layer of a metal layer of CoCrPtB is deposited changing the thickness 8 nm to 6 nm, which is thinner by a thickness of sacrifice layer 5e, 2 nm. Then, omitting the machining process for a DTM, carbon protective layer 6 and liquid lubricant layer 7 are formed to obtain a standard perpendicular magnetic recording medium of a continuous film.

Comparative Example 2

In the manufacturing method described in Example 1, the thickness of the top magnetic recording layer remains at 8 nm. Then, omitting the machining process for a DTM, carbon protective layer 6 and liquid lubricant layer 7 are formed to obtain a perpendicular magnetic recording medium with a continuous film.

Comparative Example 3

A DTM type perpendicular magnetic recording medium is manufactured in the same manner as described in Example 1, omitting the step of removing, using argon gas, the outermost surface layer 2 nm corresponding to the thickness of the sacrifice layer from the thickness 8 nm of the top surface of the magnetic recording layer of a metal layer of CoCrPtB.

The DTM type and continuous type perpendicular magnetic recording media of Example 1 and Comparative Examples 1 through 3 were measured for magnetic characteristics thereof using a spectroscopic Kerr effect measuring and evaluating apparatus. The objects of the measurement on the DTM type magnetic recording medium were protruding parts. These measurements resulted in the respective magnetization curves shown in FIGS. 2(*a*) through 2(*d*).

Magnetization curve of FIG. 2(*a*) was obtained on the DTM type magnetic recording medium in which the sacrifice layer at the top of the protruding metal layer (CoCrPtB) was removed by a thickness of 2 nm by etching with argon gas irradiation. This magnetization curve of FIG. 2(*a*) is shown equivalent to the magnetization curve of Comparative Example 1 shown in FIG. 2(*b*) that was obtained on an ordinary continuous film type perpendicular magnetic recording medium.

The magnetic recording layer of Example 1 corresponding to FIG. 2(*a*) was preliminarily formed thick by a thickness of a sacrifice layer that was supposed to be damaged due to the reactive ion plasma. The sacrifice layer was removed after undergoing damage due to the reactive ion plasma, which expanded an effective width of the protruding part. Thus, it has been demonstrated that the magnetic characteristic designed in Comparative Example 1 has been obtained in an equivalent level in the case of a DTM type magnetic recording medium. Similar results have been obtained for an over-write characteristic and an S/N ratio, though not illustrated.

Comparative Example 2 fabricated with a metal layer of 8 nm, on which a DTM machining process was not conducted, resulted in the magnetization curve of FIG. 2(*c*) showing a stepwise magnetization process.

The reason for this result is that a proportion occupied by the metal layer is so large as compared with Comparative Example 1 with a metal layer having a thickness of 6 nm that the ferromagnetic coupling within the magnetic recording layer has been broken and a lag in magnetization inversion mechanism between in the metal layer and in the granular layer occurred, showing a so-called a spin-flop phenomenon.

The phenomenon hinders the writing of data and causes blurring in write process. Thus, Example 2 is not suited to a magnetic recording medium. Comparative Example 3 exhibiting magnetization curve of FIG. 2(*d*), being a DTM type magnetic recording medium, was fabricated without removing the sacrifice layer portion of the metal layer. The magnetization curve of FIG. 2(*d*), though showing a magnetization curve similar to the curve of Example 1, exhibits a magnetization inversion initiation magnetic field slightly shifted to the low magnetic field side, due to a damage undergone on the sacrifice layer portion on the metal layer. Thus, characteristics for a magnetic recording medium comparable to Example 1 were not obtained.

Because the magnetic recording layer of Comparative Example 3 includes a damaged layer, a sacrifice layer, there is a concern of adverse effect on reliability. Therefore, a method of manufacturing a DTM type magnetic recording medium according to the invention comprising a step of removing a damaged layer, that is, the sacrifice layer, in the top region of the metal layer at the protrusion part provides magnetic characteristics equivalent to those of a continuous film type perpendicular magnetic recording medium. Thus, the method of the invention is very highly effective for manufacturing a high quality DTM type perpendicular magnetic recording medium.

The method of the invention forms protrusions and recesses on the magnetic recording layer reducing or eliminating magnetic interaction between the tracks, and makes the recessed parts nonmagnetic and the protruding parts damage-less. Consequently, the method of the invention manufactures a DTM type perpendicular magnetic recording medium of excellent quality exhibiting good medium characteristics comparable to a standard continuous film type perpendicular magnetic recording medium (of Comparative Example 1), and enhances a recording density.

Example 2

Figure 8:
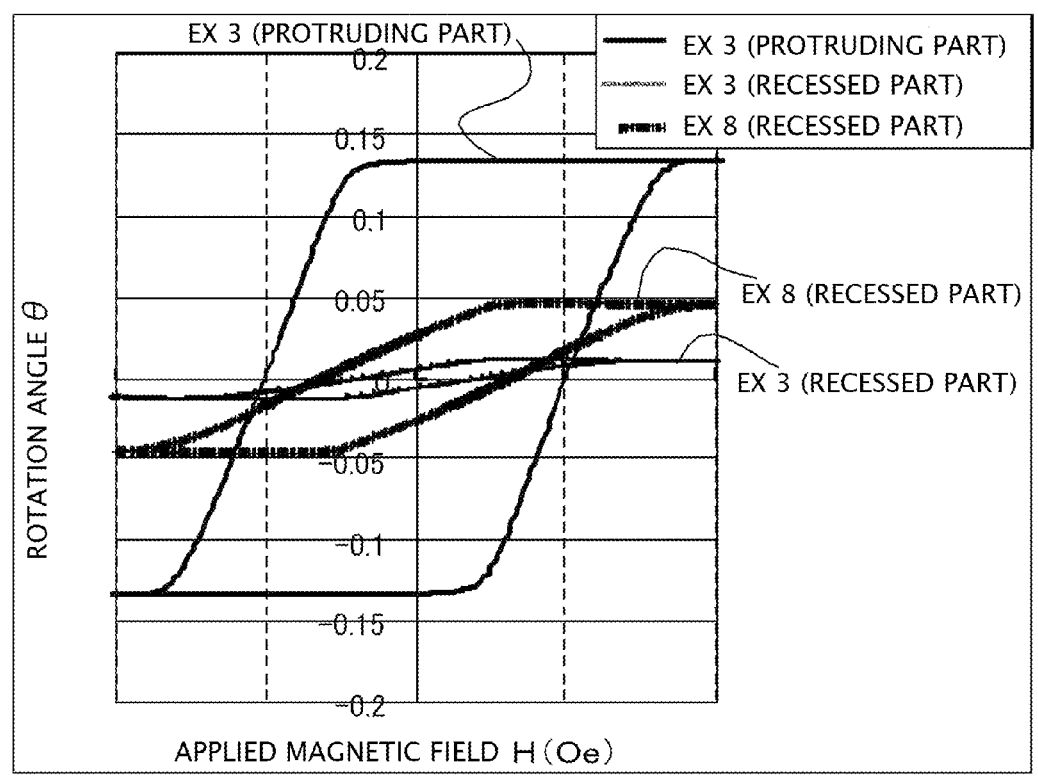
FIG. 8 shows characteristics of a DTM type perpendicular magnetic recording medium in comparison between Example 3 and Comparative Example 8.

The following describes an Example 2, which is an embodiment according to the present invention of a method of manufacturing a discrete track medium type perpendicular magnetic recording medium in detail with reference to FIG. 3(*a*) through FIG. 8.

FIGS. 3(*a*) through 3(*f*) and FIGS. 4(*g*) through 4(*l*) are schematic sectional views showing main steps according to the invention of manufacturing a DTM type perpendicular magnetic recording medium. A NiP-plated aluminum alloy with a smooth surface was used as nonmagnetic substrate 21. After cleaning, the substrate was introduced into a sputtering apparatus and amorphous soft magnetic backing layer 22 of CoZrNb having a thickness of 40 nm was deposited using a target of Co—Zr—Nb.

Then, underlayer 23 of NiFeSi 10 nm thick was deposited using a target of a permalloy of Ni—Fe—Si. Subsequently, nonmagnetic intermediate layer 24 of ruthenium 10 nm thick was deposited using a ruthenium target.

Subsequently, as shown in FIG. 5(*b*), first magnetic recording layer 25*a* of composite magnetic recording layer 25 composed of CoCrPt—$SiO_2$ having a granular structure with a thickness in the range of 4 to 8 nm was deposited using a target of 92(Co-9Cr-20Pt)-8$SiO_2$. FIG. 5(*b*) is a schematic sectional view showing an internal structure of the composite magnetic recording layer.

Subsequently, ruthenium coupling layer 25*b* was deposited in a thickness of 0.18 nm using a ruthenium target. Subsequently, second magnetic recording layer 25*c* of CoCrPt—$SiO_2$ having a granular structure was deposited with a thickness of in the range of 4 to 6 nm using a target of 92(Co-15Cr-10Pt)-8$SiO_2$. Subsequently, third magnetic recording layer 25*d* of CoCrPtB and sacrifice layer 26 of the same composition were deposited together having a total thickness of 8.0 nm using a target of 96(Co-15Cr-8Pt)-4B.

Thus, composite magnetic recording layer 25 (FIG. 3(*a*)) was laminated composed of first magnetic recording layer 25a, coupling layer 25b, second magnetic recording layer 25c, and third magnetic recording layer 25d.

A uniaxial magnetic anisotropy constant Ku of each magnetic recording layer was measured preliminarily as described below. A specimen of magnetic recording medium was individually fabricated with a construction, eliminating amorphous soft magnetic backing layer 22 and including ruthenium nonmagnetic intermediate layer 24 and solely first magnetic recording layer 25a with a thickness of 8 nm formed on intermediate layer 24. Specimens including solely a second magnetic recording layer and solely a third magnetic recording layer on intermediate layer 24 were also fabricated individually. Measurement for a uniaxial magnetic anisotropy constant Ku on those specimens was conducted using a magnetic torque meter.

Results of the measurement were: a uniaxial magnetic anisotropy constant Ku1 of first magnetic recording layer 25a was $7.7 \times 10^6$ erg/cc, a uniaxial magnetic an isotropy constant Ku2 of second magnetic recording layer 25c was $2.4 \times 10^6$ erg/cc, and a uniaxial magnetic anisotropy constant Ku3 of third magnetic recording layer 25d was $0.6 \times 10^6$ erg/cc. These values satisfies the relation Ku1>Ku2>Ku3.

Then, on composite magnetic recording layer 25 described previously, carbon protective layer 27 was deposited with a thickness of 14 nm using a carbon target and the medium was taken out from the vacuum chamber. The magnetic recording layers of composite magnetic recording layer 25 were formed by means of an RF magnetron sputtering method and the other layers (see FIG. 3(a)) were formed by means of a DC magnetron sputtering method.

Of the layers laminated in composite magnetic recording layer 25 by the method described above, a design value of a thickness of third magnetic recording layer 25d is 6.0 nm and the remainder of 2.0 nm corresponds to sacrifice layer 26. In this state having sacrifice layer 26, third magnetic recording layer 25d (a metal layer) has a large volume, and a process of magnetization inversion is divided within the composite magnetic recording layer. The characteristic as a magnetic recording medium is poor and not suited to a perpendicular magnetic recording medium. Removal of sacrifice layer 26 will be described afterwards.

Next, description will be made on a method of forming a configuration of protrusions and recesses on the surface of the continuous film carried out for DTM machining on the continuous film of the perpendicular magnetic recording medium.

Resist 28 was applied on carbon protective layer 27 as shown in FIG. 3(b) by means of a spin coating method. The resist was then pressed to form a resist pattern by means of an imprinting method as shown in FIG. 3(c). Useful materials for resist 28 include thermoplastic resins such as poly (methylmethacrylate) (PMMA) and thermosetting resins such as epoxy for a thermal nano-imprinting process, and UV hardening resins such as UV hardening acrylic resin for a UV nano-imprinting process.

Then utilizing the step configuration in the resist pattern of protrusions and recesses formed in the imprinting process, separation of the surface layer of composite magnetic recording layer 25 is carried out by a dry etching method. Specifically, as in Example 1, reactive etching processes are conducted using a reactive gas of halogen and an oxygen gas, and argon ions are irradiated in the conditions of an acceleration voltage of from 200 V to 700 V and an ion beam current of 200 mA. See FIGS. 3(d), 3(e), 3(f), and 4(g). As a result, the parts of the magnetic recording layer at the recessed parts of the outermost surface become an exposed state. The protruding parts remain in the state having carbon protective layer 27.

Subsequently, the magnetic recording layer is exposed to gas plasma of $CF_4$, a halogen reactive gas.

In order to enhance etching machining capability in the vertical direction during this process, a bias voltage in the range of 20 to 100 V is applied vertically to the whole film surface. This process promotes the reaction between the fluorine ions in the $CF_4$ gas and silicon in the magnetic recording layer to vaporize the substances, facilitating desorption from the magnetic recording layer. Moreover, chemical reaction with magnetic particles is also facilitated, promoting transformation of magnetic layer 25e at the recessed parts to a nonmagnetic state (FIG. 4(h)).

After thus fabricating DTM type composite magnetic recording layer 25 having a configuration of protrusions and recesses, carbon protective layer 27 remained on the protruding parts is temporarily removed (FIG. 4(i)). Then, a physical etching process is conducted using argon gas in the conditions of an acceleration voltage of from 200 to 700 V and an ion beam current of 200 mA. This process removes sacrifice layer 26 that is the top surface region of third magnetic recording layer 25d composed of CoCrPtB including the parts corroded with $CF_4$ in an amount of 2 nm thickness (FIG. 4(j)).

To remove sacrifice layer 26, various inert gases such as He, Kr, or Xe can be used in place of argon. After that, carbon protective layer 27 is deposited (FIG. 4(k)) again in the same manner as described above in order to make the configuration of the protrusions and recesses uniform. Then, liquid lubricant layer 29 of perfluoropolyether 2 nm thick is formed by a dip coating method (FIG. 4(l)). Thus, a DTM type perpendicular magnetic recording medium has been obtained.

Comparative Example 4

A DTM type perpendicular magnetic recording medium was manufactured in the same manner as in Example 2 except that third magnetic recording layer 25d (the metal layer) was deposited with a thickness of 6 nm, which is 2 nm thinner than the thickness 8 nm in Example 2.

Comparable Example 5

A DTM type perpendicular magnetic recording medium was manufactured in the same manner as in Example 2 except that sacrifice layer 26 that was the top layer region of third magnetic recording layer 25d (a metal layer) deposited with a thickness of 8 nm was not removed, although the sacrifice layer was removed using argon gas in Example 2.

Measurement was conducted on the DTM type perpendicular magnetic recording media manufactured in Example 2, Comparative Example 4 and Comparative Example 5 for magnetic characteristic of the protruding parts of the DTM using a spectroscopic Kerr effect measurement and evaluation apparatus. The magnetization curves obtained are shown in FIG. 6.

Observing these magnetization curves, the coercivity Hc is larger in the DTM type perpendicular magnetic recording medium manufactured in Comparative Example 4 than the one in Example 2. Thus, an effect to reduce the inversion magnetic field disappeared. Although the thickness 6 nm of the magnetic recording layer is equal to that in the Example 2, the top layer region, which is sacrifice layer 26 to be removed, is not removed in Comparative Example 4. As a result, a volume occupied by a magnetic recording layer has been decreased due to damages undergone in the nonmagnetizing process, significantly exhibiting degradation of the magnetic characteristic.

A magnetic recording medium in this state exhibits a large coercivity Hc, a high inversion magnetic field, and deteriorated ease of recording. In addition, environment resistance has been deteriorated due to corrosion and oxidation with halogen, causing migration of the magnetic alloy under an environment of high temperature and high humidity.

The DTM of Comparative Example 5, which has been manufactured with third magnetic recording layer 25d at a thickness of 8 nm, the same value as in Example 2, but having the top layer region, sacrifice layer 26, remaining, shows a magnetization curve similar to the one in Example 2 at a first glance. However, it can be found by looking closely that a magnetization inversion initiation magnetic field has shifted a little to the low magnetic field side due to partial damages remaining at the top region of the magnetic recording layer. Thus, so good a characteristic for a magnetic recording medium as of Example 2 has not been obtained. In addition, the magnetic recording layer of Comparative Example 5 containing a damaged portion as in Comparative Example 4, may exhibit deteriorated resistance to the environment due to corrosion and oxidation with halogen causing migration of the magnetic alloy under a high temperature and high humidity environment. Consequently, long term reliability of products cannot be maintained.

Removal of sacrifice layer 26 corresponding to the damaged portion of third magnetic recording layer 25d, with an appropriately set thickness and good surface flatness of sacrifice layer 26, is especially effective to maintain satisfactory recording performance of a perpendicular magnetic recording layer. Therefore, the method of the invention comprising the step of removing the sacrifice layer is remarkably effective for manufacturing a DTM type perpendicular magnetic recording medium of high quality.

Comparative Example 6

A standard type perpendicular magnetic recording medium provided with a continuous film of magnetic recording layer was manufactured in a similar procedure as in Example 2 except that third magnetic recording layer 25d was deposited to a thickness of 6 nm, omitting the DTM machining process, and sequentially forming carbon protective layer 27 and liquid lubricant layer 29.

Comparative Example 7

A standard type perpendicular magnetic recording medium provided with a continuous film of magnetic recording layer was manufactured in a similar procedure as in Example 2 except that carbon protective layer 27 and liquid lubricant layer 29 were formed on an as deposited third magnetic recording layer 25d with a thickness of 8 nm, omitting the DTM machining process.

Figure 7:
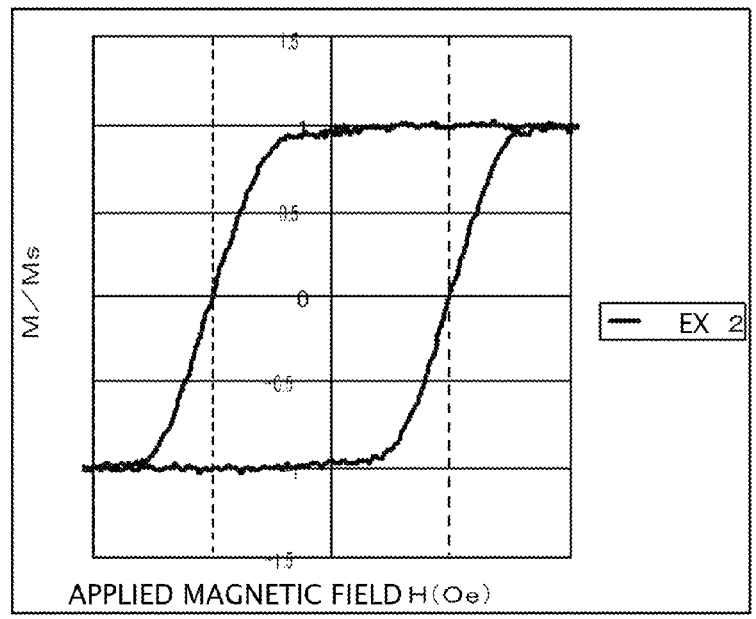
FIGS. 7(a) and 7(b) show characteristics of a DTM type perpendicular magnetic recording medium in comparison between Example 2, and Comparative Example 6 and Comparative Example 7.
Figure 7:
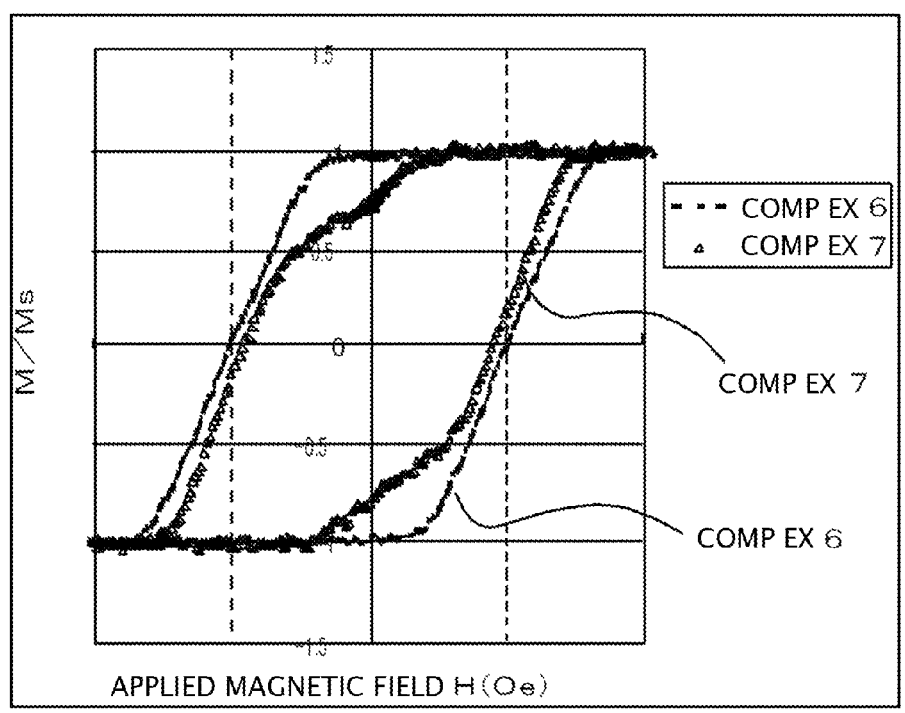

Measurement for magnetic characteristics was conducted on the perpendicular magnetic recording media provided with a continuous film of magnetic recording layer manufactured in Comparative Example 6 and Comparative Example 7, using a spectroscopic Kerr effect measurement and evaluation apparatus. FIG. 7(b) shows the obtained magnetic characteristics.

First, comparing the magnetization curve in FIG. 7(a) of the DTM type magnetic recording medium obtained in Example 2 and the magnetization curve in FIG. 7(b) of the continuous film type perpendicular magnetic recording medium of Comparative Example 6, it has been shown that Example 2 in which the top layer portion of third magnetic recording layer 25d of the DTM protruding part has been removed in an extent of 2 nm thickness by an argon gas etching process exhibits a magnetization curve similar to that of the continuous film type perpendicular magnetic recording medium of Comparative Example 6.

This fact demonstrates that an effective width of the protruding parts has expanded by removing the damaged portion of the composite magnetic recording layer by an etching process, and the magnetic characteristic designed for a continuous film type medium as Comparative Example 6 has been obtained in an equivalent level still in a medium with a configuration of a DTM. The equivalent characteristics are attained for the overwrite characteristic and the S/N ratio.

The perpendicular magnetic recording medium of a continuous film type manufactured in Comparative Example 6 has the same structure as that of the perpendicular magnetic recording medium having a three layer structure magnetic recording layer of a continuous film type disclosed in Japanese Unexamined Patent Application Publication No. 2008-287853. This structure takes advantages of relative magnitude control of the uniaxial magnetic anisotropy constants Ku of the magnetic recording layers and an effect of coupling layer disposition. As a consequence, a size of the magnetization inversion unit can be reduced by from 10 to 20 nm as compared with the one in other structures. Therefore, the structure provides a perpendicular magnetic recording medium having good electromagnetic conversion characteristics and high recording density.

Since magnetic performance is equivalent, yet in a configuration of a DTM as shown above, it is understood that the DTM type perpendicular magnetic recording medium manufactured in Example 2 has good electromagnetic conversion characteristics.

In comparison with the perpendicular magnetic recording medium having a three layer structure magnetic recording layer manufactured in Comparative Example 6, the perpendicular magnetic recording medium of a continuous film type that was manufactured in Comparative Example 7 with a thickness of third magnetic recording layer 25d at 8 nm exhibited a stepwise magnetization curve.

The reason for this result is that a proportion occupied by third magnetic recording layer 25d (a metal layer) is so large as compared with Comparative Example 6 that the ferromagnetic coupling within the magnetic recording layer has been broken and a lag in magnetization inversion mechanism between in the metal layer and in the granular layer occurred, showing a so-called a spin flop phenomenon.

This magnetic recording medium of Comparative Example 7 having a triple layer structure magnetic recording layer of a continuous film is unfavorable because it hinders the write process of data and causes blurring in write process. It is remarkably effective for preventing recording performance from degradation to remove sacrifice layer 26 at the outermost surface of the composite magnetic recording layer immediately after the process for generating a DTM configuration in order to manifest the magnetic performance of a continuous film type perpendicular magnetic recording medium such as manufactured in Comparative Example 6. Hence, it is preferred to design the thickness of composite magnetic recording layer 25 considering removal of sacrifice layer 26.

The manufacturing method that generates a DTM configuration in a composite magnetic recording layer with triple layer structure as described in Example 2 has an especially great effect in a method of manufacturing a perpendicular magnetic recording medium exhibiting a good electromagnetic conversion characteristic. The step of removing sacrifice layer 26 in particular is significantly effective and essential step in manufacturing a DTM type perpendicular magnetic recording medium that exhibits high quality equivalent to a continuous film type perpendicular magnetic recording medium still in a DTM configuration.

Example 3

A DTM type perpendicular magnetic recording medium was manufactured in the same manner as in Example 2 except that first magnetic recording layer 25a was composed of CoCrPt—$SiO_2$—$TiO_2$ magnetic recording layer 4 to 8 nm thick having a granular structure using a target of 92(Co-9Cr-20Pt)-6$SiO_2$-2$TiO_2$.

Comparative Example 8

A DTM type perpendicular magnetic recording medium was manufactured in the same manner as in Example 3 except that first magnetic recording layer 25a was composed of CoCrPt—$SiO_2$—$TiO_2$ magnetic recording layer 4 to 8 nm thick having a granular structure using a target of 92(Co-9Cr-20Pt)-2$SiO_2$-6$TiO_2$.

On the DTM type perpendicular magnetic recording media manufactured in Example 3 and Comparative Example 8, magnetic characteristics at protruding parts (Example 3 and Comparative Example 8) and recessed parts (Example 3 and Comparative Example 8) in the DTM pattern were measured using a spectroscopic Kerr effect measurement and evaluation apparatus. Resulted characteristics are illustrated in FIG. 8. The magnetic characteristics data at protruding parts of Comparative Example 8 is omitted because the magnetic characteristics of Example 3 and Comparative Example 8 are almost the same. Comparing the measurement results of the magnetization curve at the protruding parts in the DTM pattern fabricated in Example 3 and the magnetization curve at the recessed parts in the DTM pattern fabricated in the same Example 3, the two magnetization curves manifest quite different magnetic characteristics.

The resulted magnetization curves significantly manifest difference in the activity to modify magnetic properties by halogen. A coercivity Hc at the recessed parts in Example 3 is only about 20% of the Hc at the protruding parts in the same Example 3, and magnetization M is decreased as well, demonstrating progress towards nonmagnetic substance in the recessed parts.

Magnetic characteristics at recessed parts in the DTM type perpendicular magnetic recording media manufactured in Example 1 and Example 2 are similar to the magnetic characteristics shown by the magnetization curve at the recessed parts in Example 3 illustrated in FIG. 8. The situation is similar for magnetic characteristics at the protruding parts. The magnetization curve at the protruding parts in Example 3 is a magnetization curve resulting from magnetic properties of common perpendicular magnetic recording media.

In the magnetization curve of the recessed parts of the DTM pattern in the DTM type perpendicular magnetic recording medium manufactured in Comparative Example 8, the observed coercivity Hc is a relatively large magnitude of 60 to 70% of the one at the protruding parts. In addition, the θ-value corresponding to magnetization M is observed larger than the one at the recessed parts in Example 3.

This result can be attributed to a $TiO_2$-rich granular layer composing the first magnetic recording layer of the DTM type perpendicular magnetic recording medium manufactured in Comparative Example 8. The $TiO_2$ exhibits weaker chemical reaction with fluorine than $SiO_2$ and hardly vaporize and disappear, remaining in the grain boundary. As a consequence, the first magnetic recording layer stayed in a highly isolated condition between magnetic particles and did not lose magnetism.

It has been further found that a medium in a condition of $SiO_2/TiO_2<2$ (in molar ratio) gives a magnetization curve similar to the Comparative Example 8 and does not loose magnetism. In a DTM type perpendicular magnetic recording medium of Example 3, a molar ratio of $SiO_2$ to $TiO_2$ of a target material of first magnetic recording layer 25a should be preferably not smaller than 2: $SiO_2/TiO_2 \geqq 2$. If the molar ratio $SiO_2/TiO_2<2$, magnetic separation between patterned tracks is insufficient and causes blurring in write process and other degradation.

As described above, a material for a continuous film used in a DTM type perpendicular magnetic recording medium like in Example 3 is preferably a granular material containing at least $SiO_2$, which facilitates modification of magnetism. When another material, for example $TiO_2$, is mixed to $SiO_2$, a molar ratio $SiO_2/TiO_2$ is preferably set to satisfy the relation $SiO_2/TiO_2 \geqq 2$. This condition effectively provides a great function of magnetism modification peculiar to $SiO_2$ and favorably ensures magnetic separation between tracks.

According to the present invention, the magnetic interaction between the protruding part and the recessed part in the composite magnetic recording layer containing $SiO_2$ is reduced or eliminated, and the recessed parts are modified into a nonmagnetic state and the protruding parts are made damage-less. Consequently, a method of the invention manufactures a high quality DTM type perpendicular magnetic recording medium that exhibits good medium performance similar to a standard continuous film type perpendicular magnetic recording medium. Therefore, a recording density is also enhanced.

As described on some preferred embodiments, the present invention provides a DTM type perpendicular magnetic recording medium having a high quality triple layer structure magnetic recording layer that presents good electromagnetic characteristics equivalent to a continuous film type perpendicular magnetic recording medium. Use of a granular magnetic recording layer containing $SiO_2$ gives a large magnetism modification effect in a magnetic recording layer using a reactive halogen gas, thereby accomplishing complete magnetic separation in a DTM pattern and reducing magnetic interaction (interference) between tracks. Therefore, a DTM type perpendicular magnetic recording medium is provided with an enhanced recording density.

Even when the magnetic recording layer is damaged due to reactive halogen gas and oxygen gas, the damaged layer is removed as a preliminarily disposed sacrifice layer. Consequently, the magnetic recording layer of the protruding parts in a DTM pattern has a recording performance equivalent to a continuous film type perpendicular magnetic recording layer. Therefore, the present invention provides a simple method of manufacturing a high quality DTM type perpendicular magnetic recording medium.

Thus, a discrete track medium type perpendicular magnetic medium has been described according to the present invention. Many modifications and variations may be made to the techniques and structures described and illustrated herein without departing from the spirit and scope of the invention. Accordingly, it should be understood that the methods and devices described herein are illustrative only and are not limiting upon the scope of the invention.

This application is based on, and claims priority to, Japanese Patent Applications No. 2009-196957, filed on Aug. 27, 2009 and No. 2009-262539, filed on Nov. 18, 2009. The disclosure of the priority applications in their entirety, including the drawings, claims, and the specifications thereof, is incorporated herein by reference.

DESCRIPTION OF SYMBOLS 1, 21: nonmagnetic substrate
2, 22: soft magnetic backing layer
3, 23: underlayer
4, 24: nonmagnetic intermediate layer
5, 25: magnetic recording layer or composite magnetic recording layer
5e: sacrifice layer
6: carbon protective layer
7: liquid lubricant layer
5a, 25a: first magnetic recording layer
5b, 25b: coupling layer
5c, 25c: second magnetic recording layer
5d, 25d: third magnetic recording layer
25e: magnetic layer in a recessed part
26: sacrifice layer
27: carbon protective layer
28: resist
29: liquid lubricant layer

What is claimed is:

1. A method of manufacturing a discrete track medium type perpendicular magnetic recording medium comprising:
laminating at least a magnetic recording layer, a sacrifice layer, and a carbon protective layer on a nonmagnetic substrate in this order;
using a mask of a resist film pattern formed in a concentric pattern to form protruding parts for constructing recording tracks and recessed parts;
selectively removing the carbon protective layer to expose the sacrifice layer and the magnetic recording layer in the recessed parts,
modifying the sacrifice layer and the magnetic recording layer exposed at the recessed parts into a nonmagnetic state;
removing the resist film, the carbon protective layer, and the sacrifice layer from the protruding parts; and
depositing a carbon protective layer and a lubricant layer in this order on the recessed parts and the protruding parts,
wherein the magnetic recording layer is a composite magnetic recording layer including an upper magnetic recording layer, a coupling layer, and a lower magnetic recording layer, the composite magnetic recording layer further including a middle magnetic recording layer between the upper magnetic recording layer and the coupling layer,
wherein a uniaxial magnetic anisotropy constant Ku1 of the lower magnetic recording layer, a uniaxial magnetic anisotropy constant Ku2 of the middle magnetic recording layer, and a uniaxial magnetic anisotropy constant Ku3 of the upper magnetic recording layer are different from each other and satisfies a relation between their magnitudes Ku1>Ku2>Ku3.

2. The method of manufacturing a discrete track medium type perpendicular magnetic recording medium according to claim 1, wherein removal of the carbon protective layer is carried out by a reactive ion etching process using oxygen gas.

3. The method of manufacturing a discrete track medium type perpendicular magnetic recording medium according to claim 1, wherein a process of removing the resist film and the carbon protective layer is carried out by a reactive ion etching process, and a process of removing the sacrifice layer is carried out by a process of irradiation of inert gas ions.

4. The method of manufacturing a discrete track medium type perpendicular magnetic recording medium according to claim 1, wherein the coupling layer is composed of an element selected from the group consisting of V, Cr, Fe, Co, Ni, Cu, Nb, Mo, Ru, Rh, Ta, W, Re, and Ir, and alloys mainly composed of at least one of these elements, and has a thickness at most 0.3 nm.

5. The method of manufacturing a discrete track medium type perpendicular magnetic recording medium according to claim 1, wherein a soft magnetic backing layer and a nonmagnetic underlayer are further provided in this order between the nonmagnetic substrate and the magnetic recording layer.

6. The method of manufacturing a discrete track medium type perpendicular magnetic recording medium according to claim 5, wherein the magnetic recording layer contains at least a ferromagnetic material having an axis of easy magnetization orienting in the direction perpendicular to a film surface of the magnetic recording layer.

7. The method of manufacturing a discrete track medium type perpendicular magnetic recording medium according to claim 1, wherein the lower magnetic recording layer and the middle magnetic recording layer contain a ferromagnetic material having a granular structure.

8. The method of manufacturing a discrete track medium type perpendicular magnetic recording medium according to claim 7, wherein the lower magnetic recording layer and the middle magnetic recording layer both having the granular structure contain a nonmagnetic oxide(s) at least one of which is $SiO_2$.

9. The method of manufacturing a discrete track medium type perpendicular magnetic recording medium according to claim 1, wherein the sacrifice layer has the same composition as a composition of the adjacent magnetic recording layer.

10. The method of manufacturing a discrete track medium type perpendicular magnetic recording medium according to claim 9, wherein the sacrifice layer has a thickness in a range of 0.5 to 5.0 nm.

11. The method of manufacturing a discrete track medium type perpendicular magnetic recording medium according to claim 1, wherein a process of modifying the sacrifice layer and the magnetic recording layer exposing at the recessed parts into a nonmagnetic state is carried out by exposing to reactive ion plasma containing a halogen-containing gas, reactive etching using oxygen gas, and irradiation of inert gas ions.

12. The method of manufacturing a discrete track medium type perpendicular magnetic recording medium according to claim 11, wherein the halogen-containing gas contains fluorine ions.

13. The method of manufacturing a discrete track medium type perpendicular magnetic recording medium according to claim 12, wherein the magnetic recording layer contains at least one substance that vaporizes and disappears by chemical reaction with the reactive ion plasma containing the fluorine ions.

14. The method of manufacturing a discrete track medium type perpendicular magnetic recording medium according to claim 13, wherein the substance that vaporizes and disappears is $SiO_2$.

15. The method of manufacturing a discrete track medium type perpendicular magnetic recording medium according to claim 14, wherein the $SiO_2$ of the nonmagnetic oxide(s) is contained in an amount at least two times an amount of the nonmagnetic oxides other than the $SiO_2$.

16. A method of manufacturing a discrete track medium type perpendicular magnetic recording medium comprising:

laminating at least a magnetic recording layer, a sacrifice layer, and a carbon protective layer on a nonmagnetic substrate in this order;

using a mask of a resist film pattern formed in a concentric pattern to form protruding parts for constructing recording tracks and recessed parts;

selectively removing the carbon protective layer to expose the sacrifice layer and the magnetic recording layer in the recessed parts, modifying the sacrifice layer and the magnetic recording layer exposed at the recessed parts into a nonmagnetic state;

removing the resist film, the carbon protective layer, and the sacrifice layer from the protruding parts; and depositing a carbon protective layer and a lubricant layer in this order on the recessed parts and the protruding parts, wherein a soft magnetic backing layer and a nonmagnetic underlayer are further provided in this order between the nonmagnetic substrate and the magnetic recording layer, wherein the magnetic recording layer contains at least a ferromagnetic material having an axis of easy magnetization orienting in the direction perpendicular to a film surface of the magnetic recording layer, and is a composite magnetic recording layer including an upper magnetic recording layer, a coupling layer, and a lower magnetic recording layer, the composite magnetic recording layer further including a middle magnetic recording layer between the upper magnetic recording layer and the coupling layer, wherein a uniaxial magnetic anisotropy constant $Ku1$ of the lower magnetic recording layer, a uniaxial magnetic anisotropy constant $Ku2$ of the middle magnetic recording layer, and a uniaxial magnetic anisotropy constant $Ku3$ of the upper magnetic recording layer are different from each other and satisfies a relation between their magnitudes $Ku1>Ku2>Ku3$.

* * * * *